United States Patent
Kim

(10) Patent No.: US 7,872,712 B2
(45) Date of Patent: Jan. 18, 2011

(54) ARRAY SUBSTRATE COMPRISING A PIXEL ELECTRODE INCLUDING CONCAVE PATTERNS HAVING CONVEX PATTERNS IN CENTRAL PORTIONS OF THE CONCAVE PATTERN, METHOD OF MANUFACTURING THE SAME, AND DISPLAY PANEL HAVING THE SAME

(75) Inventor: Jae-Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 314 days.

(21) Appl. No.: 11/512,768

(22) Filed: Aug. 30, 2006

(65) Prior Publication Data
US 2007/0139591 A1     Jun. 21, 2007

(30) Foreign Application Priority Data
Dec. 19, 2005     (KR)     .............. 10-2005-0125230

(51) Int. Cl.
G02F 1/1335     (2006.01)
G02F 1/1333     (2006.01)
(52) U.S. Cl. .................. 349/114; 349/113; 349/138
(58) Field of Classification Search ......... 349/113–115, 349/138
See application file for complete search history.

(56) References Cited
U.S. PATENT DOCUMENTS

| 5,418,635 | A | | 5/1995 | Mitsui et al. | |
|---|---|---|---|---|---|
| 5,936,688 | A | * | 8/1999 | Tsuda et al. | 349/113 |
| 6,342,935 | B1 | * | 1/2002 | Jang et al. | 349/113 |
| 6,757,038 | B2 | * | 6/2004 | Itoh et al. | 349/113 |
| 7,123,324 | B2 | * | 10/2006 | Yoshii et al. | 349/113 |
| 2002/0051107 | A1 | * | 5/2002 | Nagayama et al. | 349/113 |
| 2003/0179329 | A1 | * | 9/2003 | Choi | 349/113 |
| 2005/0270454 | A1 | * | 12/2005 | Ahn et al. | 349/114 |

* cited by examiner

Primary Examiner—David Nelms
Assistant Examiner—Charles Chang
(74) Attorney, Agent, or Firm—Cantor Colburn LLP

(57) ABSTRACT

An array substrate for enhancing reflectivity, a method for manufacturing the same and display panel having the same are presented. The array substrate includes a plurality of gate lines, a plurality of source lines, a plurality of pixel portions, a plurality of switching elements and a plurality of pixel electrodes. The gate lines extend in a first direction. The source lines extend in a second direction across the first direction. The pixel portions are defined by the gate lines and the source lines. Each switching element is formed on a respective pixel electrode and is electrically connected to one of the gate lines and one of the source lines. Each pixel electrode is electrically connected to a respective switching electrode, and includes a concave pattern having a convex pattern in a central portion. The concave pattern having the convex pattern in the central portion enhances the reflectivity of the array substrate.

20 Claims, 11 Drawing Sheets

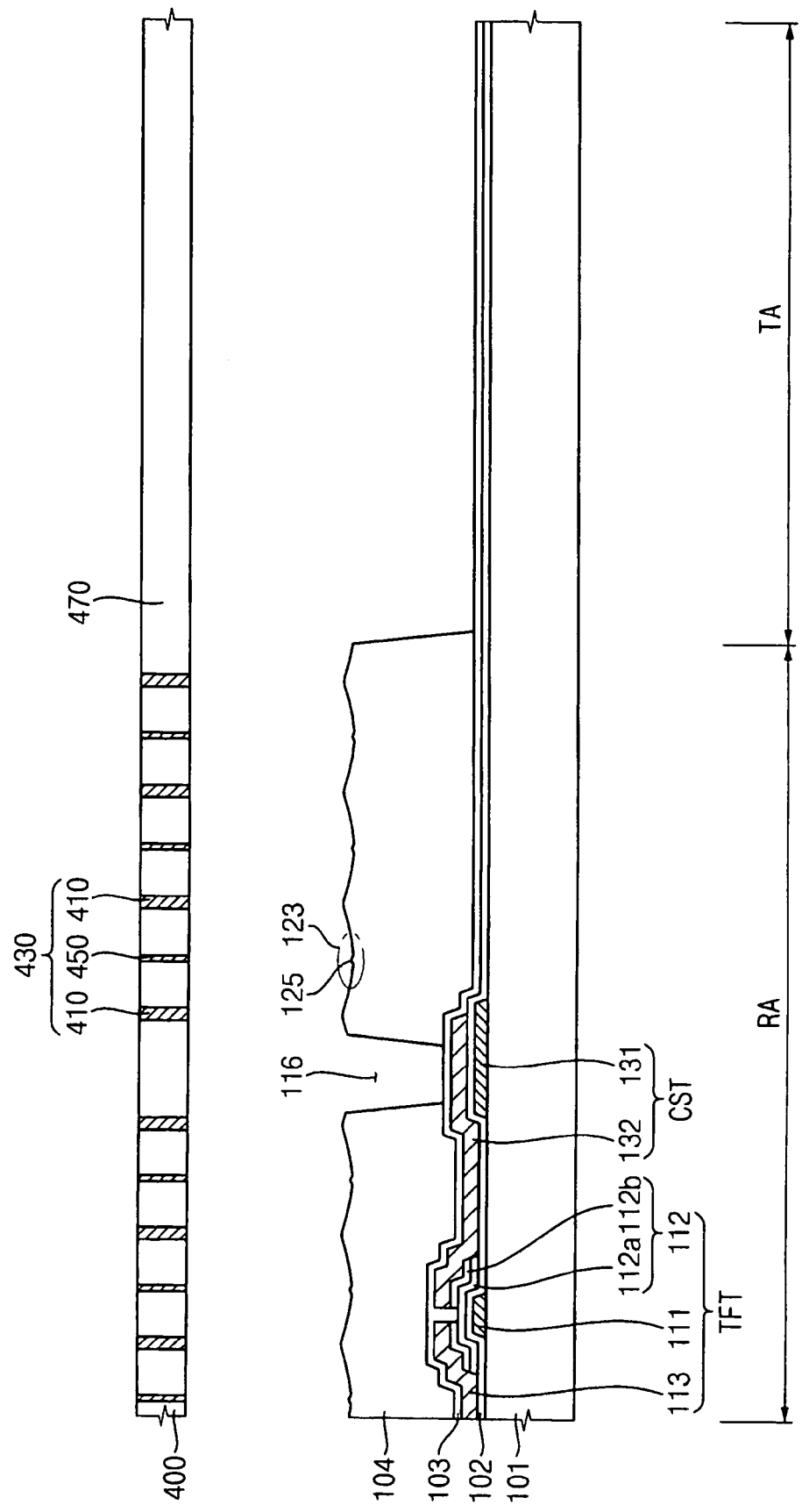

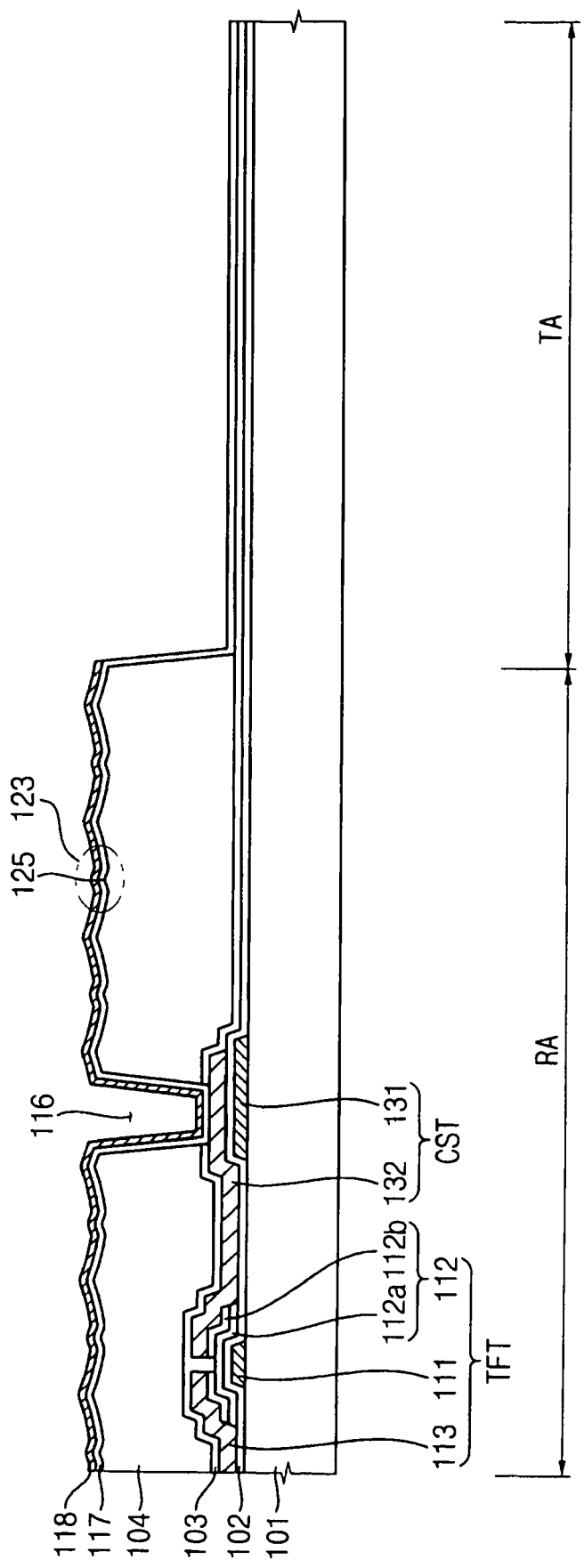

ARRAY SUBSTRATE COMPRISING A PIXEL ELECTRODE INCLUDING CONCAVE PATTERNS HAVING CONVEX PATTERNS IN CENTRAL PORTIONS OF THE CONCAVE PATTERN, METHOD OF MANUFACTURING THE SAME, AND DISPLAY PANEL HAVING THE SAME

The present application claims priority to Korean Patent Application No. 2005-0125230, filed on Dec. 19, 2005, and all the benefits accruing therefrom under 35 USC §119, the contents of which in its entirety are herein incorporated by reference.

BACKGROUND OF THE INVENTION

1. Field of the Invention

The present invention relates to an array substrate, a method for manufacturing the array substrate and a display panel having the array substrate. More particularly, the present invention relates to an array substrate capable of enhancing reflectivity, a method for manufacturing the array substrate and display panel having the array substrate.

2. Description of the Related Art

Generally, a liquid crystal display ("LCD") apparatus displays an image by using a liquid crystal having an intermediate property between a liquid and solid phase. In the LCD apparatus, a voltage is applied to a layer of liquid crystal interposed between two glass substrates (e.g., a display panel), and alignment of liquid crystal molecules of the liquid crystal layer is changed. Therefore, light is transmitted through and exits from the liquid crystal layer to display the image.

The LCD apparatus is classified as either a transmissive type, a reflective type or a reflective-transmissive type, according to a light source used. The transmissive type LCD apparatus displays the image by transmitting light from a backlight through the display panel. The reflective type LCD apparatus displays the image by reflecting an external light incident into the display panel. The reflective-transmissive type LCD apparatus displays the image by dividing the display panel into a transmissive area and a reflective area, and then transmitting the light from the backlight through a transmissive area and reflecting the external light from a reflective area.

The reflective type and the reflective-transmissive type LCD apparatus have a reflective electrode reflecting the external light. Luminance of the reflective light reflected by the reflective electrode is most important in the reflective type and the reflective-transmissive type LCD apparatus. Power consumption of the LCD apparatus is minimized by enhancing the reflectivity of the reflective electrode, and a display quality in a reflective mode is enhanced.

BRIEF SUMMARY OF THE INVENTION

The present invention provides an array substrate capable of enhancing reflectivity thereof.

The present invention also provides a method for manufacturing the above-mentioned array substrate.

The present invention also provides a display panel including the above-mentioned array substrate.

In an exemplary embodiment of an array substrate according to the present invention, the array substrate includes a plurality of gate lines, a plurality of source lines, a plurality of pixel portions, a plurality of switching elements and a plurality of pixel electrodes. The plurality of gate lines is formed extending in a first direction. The plurality of source lines is formed extending in a second direction across the first direction. The plurality of pixel portions is defined by the plurality of gate lines and the plurality of source lines. Each switching element is formed on a respective pixel portion and is electrically connected to one of the gate lines and one of the source lines. Each pixel electrode is electrically connected to a respective switching element, and has a concave pattern with a convex pattern in a central portion.

In an exemplary embodiment of a method for manufacturing the array substrate according to the present invention, the method for manufacturing an array substrate includes forming a switching element on a base substrate, electrically connected to a gate line extending in a first direction and a source line extending in a second direction across the first direction, forming an organic insulating layer on the base substrate having the switching element formed thereon, patterning the organic insulating layer to have a concave pattern with respect to a reference surface, and to have a convex pattern with respect to an interfacial surface of the concave pattern in a central portion of the concave pattern, and forming a pixel electrode contacting the switching element on the organic insulating layer having the concave pattern formed thereon.

In an exemplary embodiment of a display panel according to the present invention, the display panel includes an array substrate and a color filter substrate. The array substrate includes a plurality of pixel portions. Each of the pixel portions includes a respective switching element and a respective pixel electrode having a concave pattern that includes a convex pattern in a central portion and is electrically connected to the respective switching element. The color filter substrate is opposite the array substrate and the substrates receive a liquid crystal layer therebetween.

Therefore, the reflectivity is enhanced by forming the concave pattern having the convex pattern in the central portion of the concave pattern.

BRIEF DESCRIPTION OF THE DRAWINGS

The above and other features and advantages of the present invention will become more apparent by describing exemplary embodiments thereof with reference to the accompanying drawings, in which:

FIGS. 8A to 8C are cross-sectional views illustrating a method for manufacturing the reflective-transmissive type array substrate in FIG. 5;

DETAILED DESCRIPTION OF THE INVENTION

Figure 1:
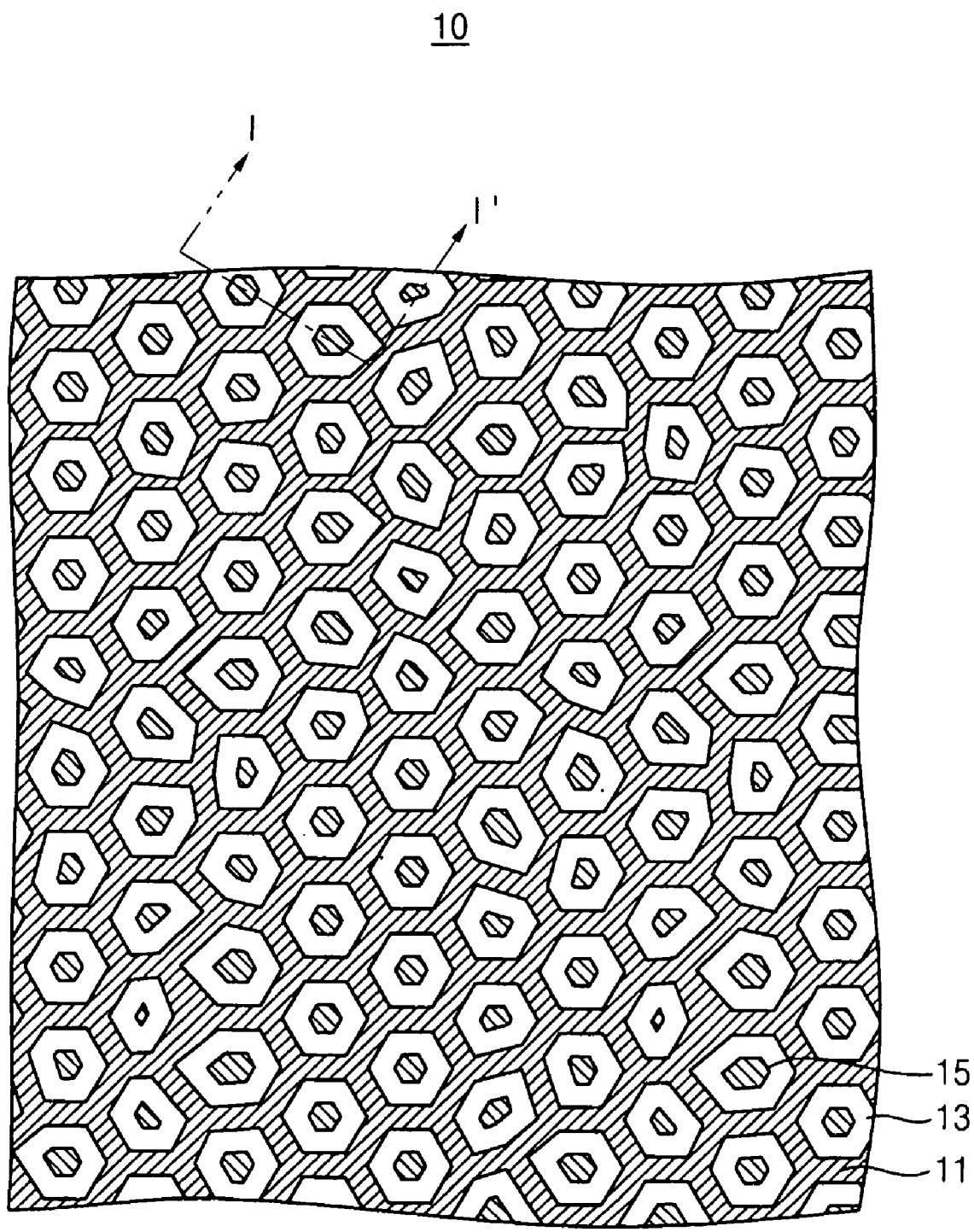
FIG. 1 is a plan view illustrating a mask for forming a reflective lens according to an exemplary embodiment of the present invention.

The present invention is described more fully hereinafter with reference to the accompanying drawings, in which exemplary embodiments of the invention are shown. The present invention may, however, be embodied in many different forms and should not be construed as being limited to the exemplary embodiments set forth herein. Rather, these exemplary embodiments are provided so that this disclosure will be thorough and complete, and will fully convey the scope of the invention to those of ordinary skill in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein are interpreted accordingly.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the present invention should not be construed as being limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of the present invention will be described with reference to the accompanied drawings.

Figure 2:
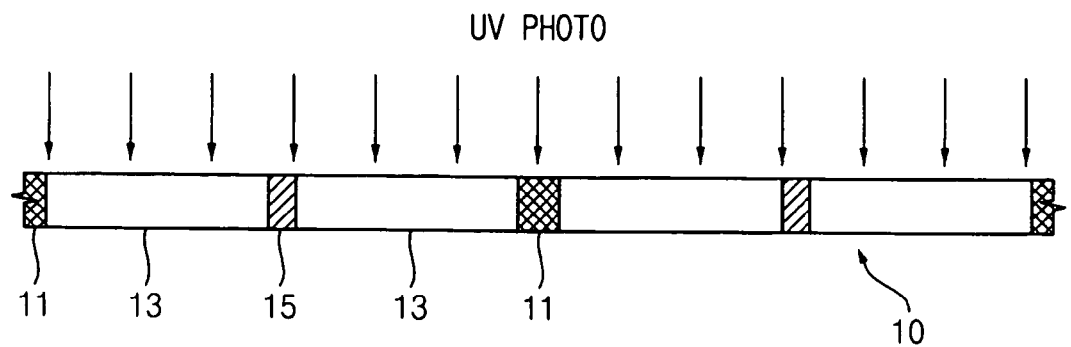
FIG. 2 is a cross-sectional view illustrating the reflective lens formed by the mask in FIG. 1.
Figure 2:
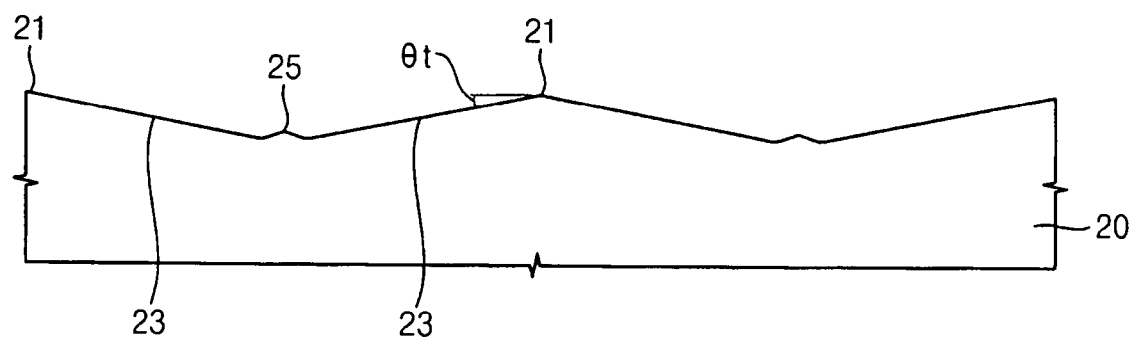

FIG. 1 is a plan view illustrating a mask for forming a reflective lens according to an exemplary embodiment of the present invention. FIG. 2 is a cross-sectional view illustrating the reflective lens formed by the mask in FIG. 1.

Referring to FIG. 1, the mask 10 includes a blocking portion 11, an opening portion 13 and a partial opening portion 15. The blocking portion 11 blocks an ultraviolet ("UV") light, and the opening portion 13 transmits the UV light therethrough. The partial opening portion 15 has a slit pattern or a half tone pattern formed thereon, which disperses and diffracts the UV light. In addition, the partial opening portion 15 transmits the UV light therethrough relatively less than the opening portion 13.

The blocking portion 11 has a mesh shape having a plurality of patterns connected to each other. For example, the patterns may include polygonal patterns, circular patterns and so on. The opening portion 13 is an inner portion of each of the polygonal patterns that is defined by the blocking portion 11. The partial opening pattern 15 is formed in the central portion of the opening pattern 13. The partial opening pattern 15 is formed with the slit pattern or the half tone pattern.

Referring to FIG. 2, the mask 10 is disposed on a photosensitive resin layer 20 to form a pattern. The UV light is irradiated onto the photosensitive resin layer 20 through the mask 10, and then forms the pattern on the photosensitive resin layer 20.

In particular, a reference surface 21 of a reflective lens is formed on a first portion of the photosensitive resin layer 20 corresponding to the blocking portion 11 that blocks the UV light. A concave pattern 23 is formed on a second portion of the photosensitive resin layer 20 corresponding to the opening portion 13 that fully transmits the UV light therethrough. In addition, the concave pattern 23 has a concave interfacial surface with respect to the reference surface 21. A convex pattern 25 is formed on a third portion of the photosensitive resin layer 20 corresponding to the partial opening portion 15 that has the slit pattern or the half tone pattern formed thereon and transmits the UV light relatively less than the opening portion 13. In addition, the convex pattern 25 has a convex interfacial surface with respect to the concave pattern 23 in the central portion of the concave pattern 23.

The concave pattern 23 formed on the opening portion 13, has an interfacial inclination angle $\theta_t$ between about 0° and about 20° so that a reflective light is reflected with a uniform angle distribution. The convex pattern 25 formed by the partial opening portion 15 has an interfacial inclination angle between about 5° and about 15° so that the convex pattern 25 increases a size of a region (e.g., surface area) having an interfacial inclination angle of about 10° in the concave pattern 23. When the concave pattern 23 does not include the convex pattern 25, an interfacial inclination angle of a central portion of the concave pattern 23 without the convex pattern 25 is about 0°. In FIG. 2, however, the concave pattern 23 includes the convex pattern 25. In FIG. 2, the concave pattern 23 has the convex pattern 25 having the interfacial inclination angle of about 10° in the central portion, so that the size of the region having the interfacial inclination angle of about 10° is increased (e.g., increased surface area having the interfacial inclination angle of about 10°). When the interfacial inclination angle is about 10°, a reflectivity of the light that is reflected from the concave pattern toward a front surface is maximized.

Therefore, the concave pattern 23 having the convex pattern 25 in the central portion greatly enhances the reflectivity of the light.

Figure 3:
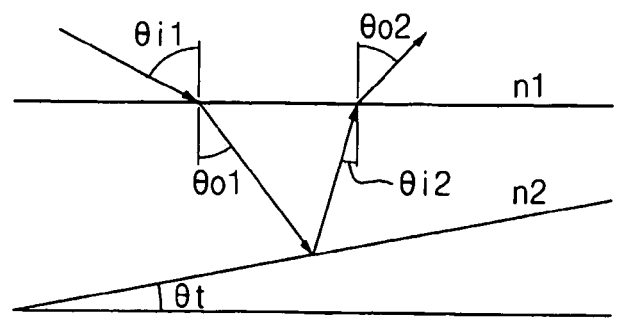
FIG. 3 is a conceptual view illustrating Snell's Law.
Figure 4:
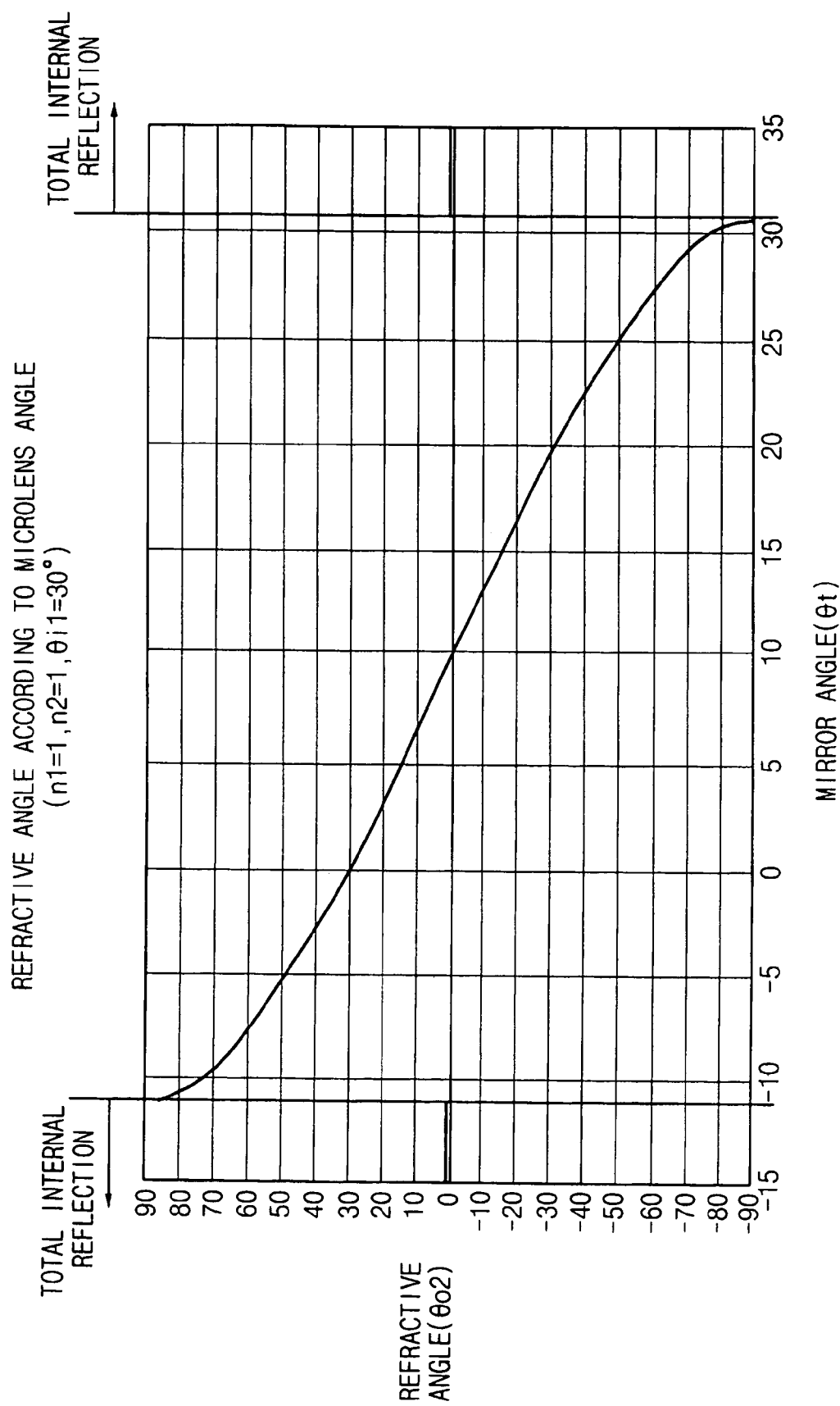
FIG. 4 is a graph showing an exiting angle of a reflective light according to an inclination angle of a lens pattern in FIG. 2.

FIG. 3 is a conceptual view illustrating Snell's Law. FIG. 4 is a graph illustrating an exiting angle of a reflective light according to an inclination angle of a lens pattern in FIG. 2.

Referring to FIGS. 3 and 4, Snell's law is explained by Equation 1. When light from a first material having a first refractive index n1 is incident into a second material having a second refractive index n2, a sine ratio of an incidence angle $\theta_i 1$ to a first refractive angle $\theta_o 1$ is constant.

In addition, when the reflective light from the second material is incident into the first material, the sine ratio of an incidence angle of the reflective light $\theta_i 2$ to a second refractive angle $\theta_o 2$ is also constant.

$$(\mathrm{Sin}\ \theta_i 1)/(\mathrm{Sin}\ \theta_o 1) = (n2)/(n1),$$

$$(\mathrm{Sin}\ \theta_i 2)/(\mathrm{Sin}\ \theta_o 2) = (n1)/(n2) \qquad \text{Equation 1}$$

Referring to Equation 1, the second refractive angle $\theta_o 2$ is expressed by the following Equation 2:

$$\theta_o 2 = \sin^{-1}\{(n2/n1)\sin \theta_i 2\}$$

$$\theta_i 2 = \sin^{-1}\{(n1/n2)\sin \theta_i 1\} - 2\theta_t$$

In Equation 2, $\theta_t$ represents an interfacial inclination angle of the lens pattern.

According to Equation 2, as depicted in FIG. 4, when the interfacial inclination angle of the lens pattern $\theta_t$ is in a range between about 0° and about 20°, the second refractive angle $\theta_o 2$ is conically shaped having a refractive angle in a range between about 30° and about −30°, respectively. In Equation 2 and FIG. 4, when the interfacial inclination angle of the lens pattern $\theta_t$ is about 10°, the second refractive angle $\theta_o 2$ may be about 0° and the light may exit substantially perpendicular to a surface between the first and second materials.

Therefore, an efficiency of the reflectivity of the reflective lens increases, as the size of the area having the interfacial inclination angle $\theta_t$ of about 10° increases.

Figure 5:
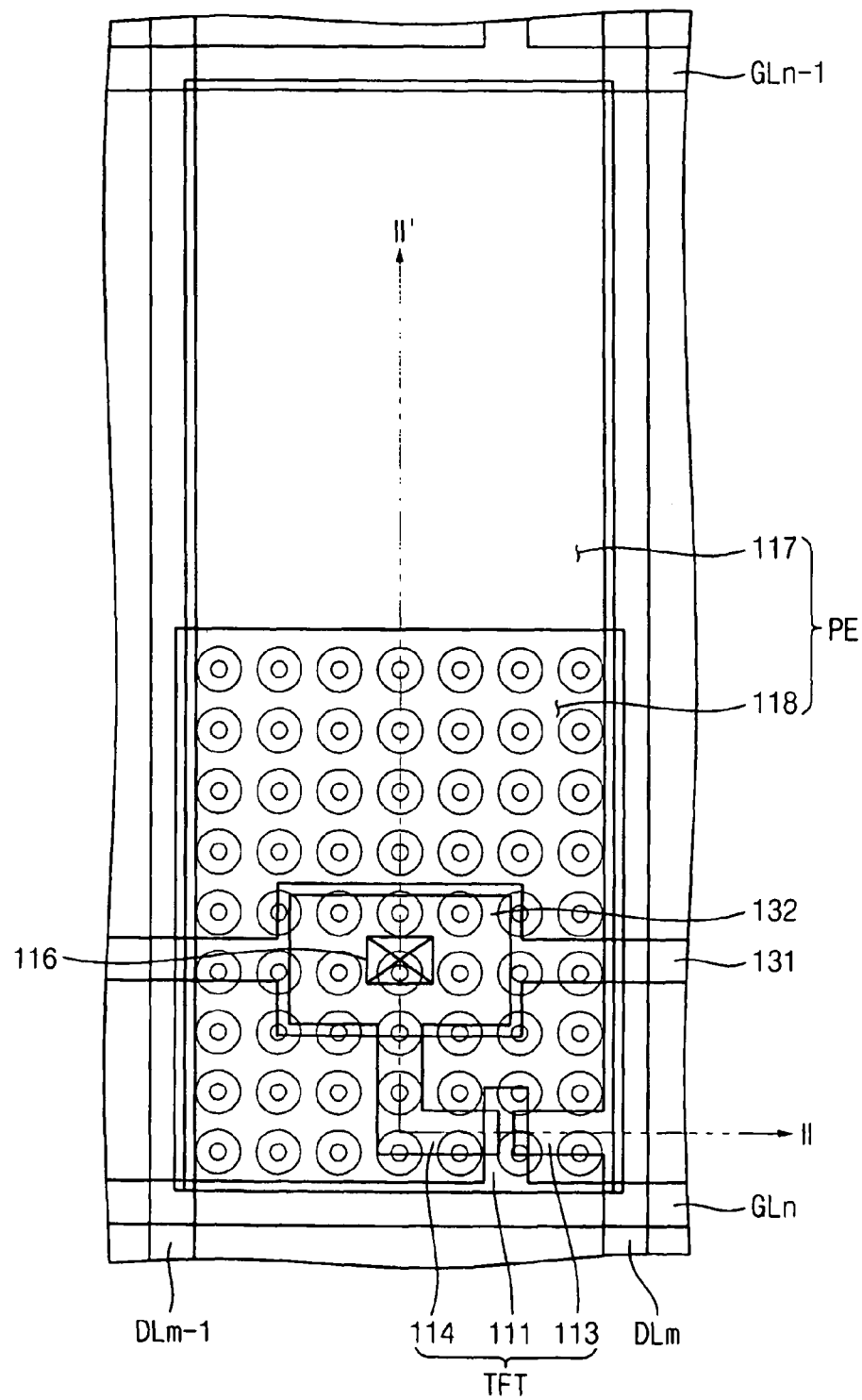
FIG. 5 is a plan view illustrating a reflective-transmissive type array substrate according to another exemplary embodiment of the present invention.
Figure 6:
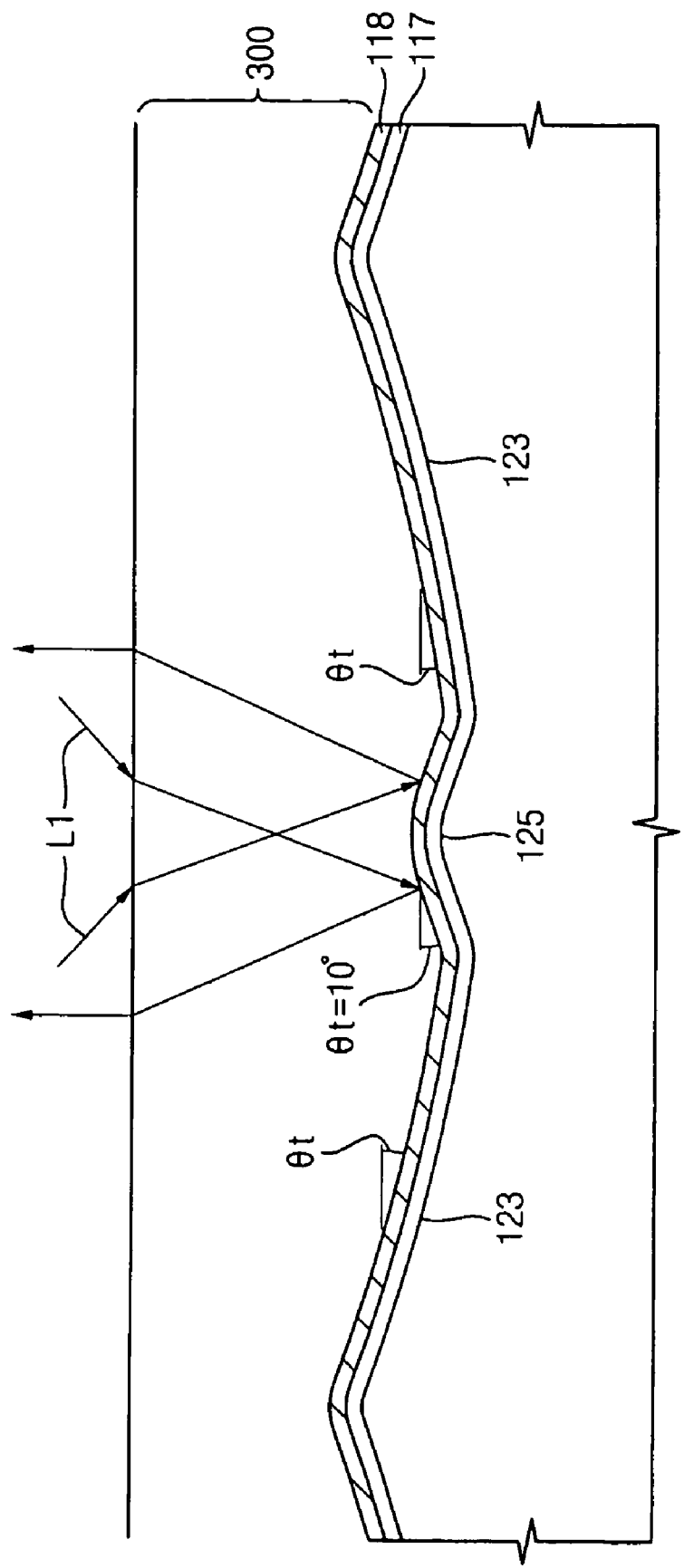
FIG. 6 is an enlarged cross-sectional view taken along line II-II' of FIG. 5.
Figure 7:
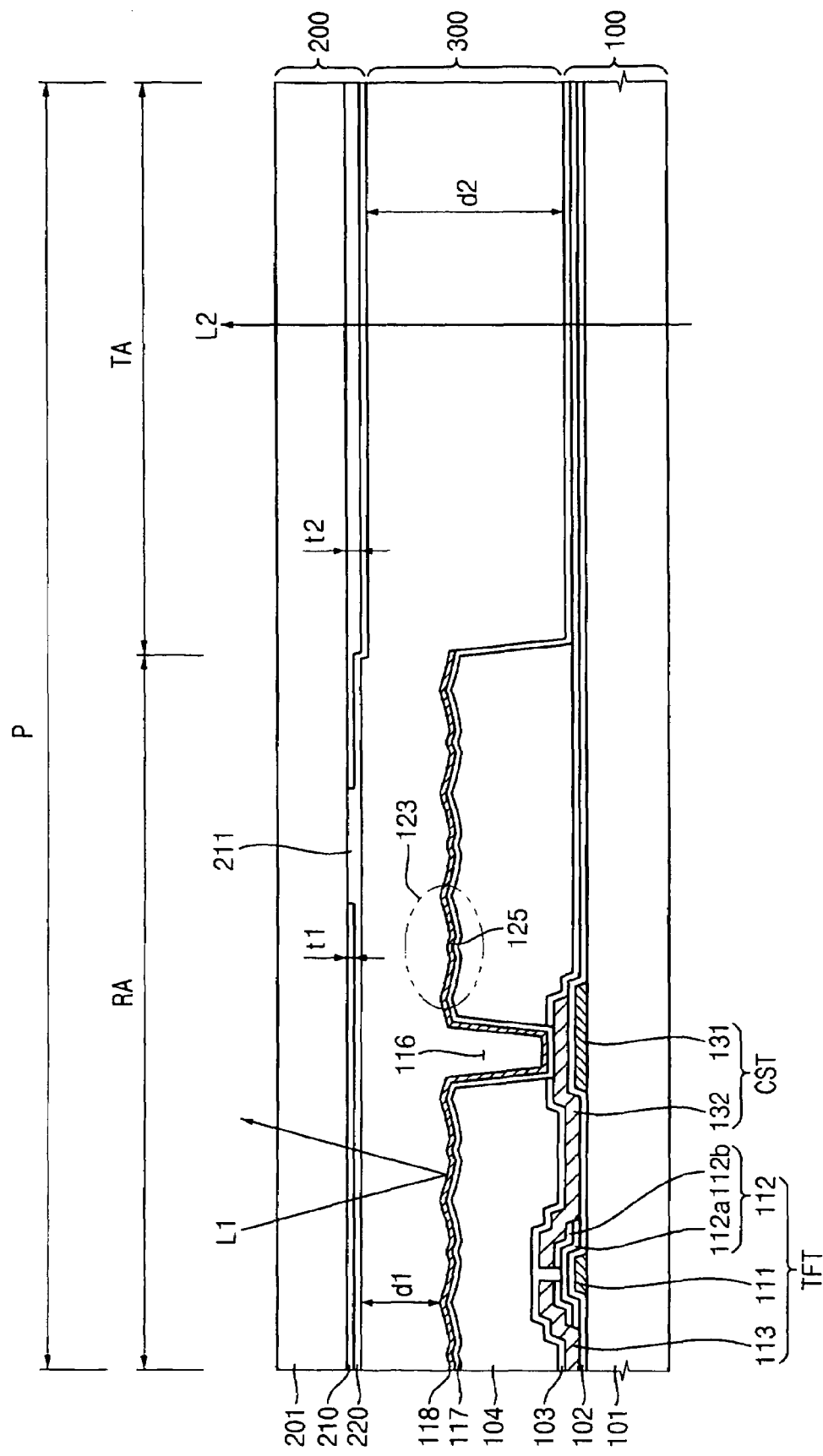
FIG. 7 is an enlarged cross-sectional view of FIG. 5 illustrating a reflective electrode in FIG. 6.

FIG. 5 is a plan view illustrating a reflective-transmissive type array substrate according to another exemplary embodiment of the present invention. FIG. 6 is an enlarged cross-sectional view taken along line II-II' of FIG. 5. FIG. 7 is an enlarged cross-sectional view of FIG. 5 illustrating a reflective electrode in FIG. 6.

Referring to FIGS. 5 to 7, a display panel includes a reflective-transmissive array substrate 100, a color filter substrate 200 and a liquid crystal layer 300.

The array substrate 100 includes a first base substrate 101, a plurality of gate lines GLn−1 and GLn extending in a first direction and a plurality of source lines DLm−1 and DLm extending in a second direction across the first direction. The gate and source lines GLn−1, GLn, DLm−1 and DLm are formed on the first base substrate 101. A plurality of pixel portions P is defined by the gate lines GLn−1 and GLn intersecting the source lines DLm−1 and DLm. The pixel portions P are also formed on the first base substrate 101. Each pixel portion P has a corresponding switching element TFT electrically connected to one of the gate lines GLn and one of the source lines DLm, a pixel electrode PE electrically connected to the switching element TFT and a storage capacitor CST.

The switching element TFT includes a gate electrode 111, a source electrode 113 and a drain electrode 114. The gate electrode 111 extends from the gate line GLn, and the source electrode 113 extends from the source line DLm. In addition, the drain electrode 114 is electrically connected to the pixel electrode PE through a contact hole 116.

A gate insulating layer 102 is formed on the gate lines GLn−1 and GLn and the gate electrode 111. A channel portion 112 is formed on the gate insulating layer 102 corresponding to a portion having the gate electrode 111. The channel portion 112 includes an active layer 112a and an ohmic contact layer 112b. A portion of the ohmic contact layer 112b between the source electrode 113 and the drain electrode 114 is removed to define a channel of the switching element TFT. A protective layer 103 is formed on the switching element TFT and the source lines DLm−1 and DLm.

The pixel electrode PE includes a transmissive electrode 117 and a reflective electrode 118. The transmissive electrode 117 is electrically connected to the drain electrode 114 through the contact hole 116, and is formed on a portion on which the pixel portion P is defined. The reflective electrode 118 is formed on a small portion of the transmissive electrode 117, and defines the pixel portion P as a reflective area RA and a transmissive area TA.

As best seen with reference to FIG. 7, a concave pattern 123 having a convex pattern 125 in a central portion of the concave pattern 123 is formed on the reflective electrode 118.

In Equations 1 and 2, the interfacial inclination angle $\theta_t$ of each concave pattern 123 is in some range for an exiting angle of the reflective light to be uniform in reference to the front surface at a reference angle of 0°. When the interfacial inclination angle $\theta_t$ is in the range between about 0° and about 20°, the exiting angle of the reflective light has a conical shape, for example, in the range between about −30° and about 30° with reference to a normal line substantially perpendicular to the front surface. The normal line corresponds to an angle of about 0°. In FIGS. 5 to 7, the interfacial inclination angle $\theta_t$ may be about 10° so that the exiting angle is about 0°.

The concave pattern 123 has the convex pattern 125 in the central portion, and an interfacial inclination angle of the convex pattern 125 is between about 5° and about 15°. Therefore, the convex pattern 125 increases a size of a region having a 10° interfacial inclination angle of the concave pattern 123. When the interfacial inclination angle is about 10°, a reflectivity of the light reflected from the concave pattern 123 having the convex pattern 125 in the central portion toward the front surface is maximized.

The reflective electrode 118 is formed on the concave pattern 123 and the convex pattern 125 to greatly enhance the reflectivity of the reflective electrode 118.

An organic insulating layer 104 is formed between the switching element TFT and a transmissive electrode 117. An upper surface of the organic insulating layer 104 is patterned to form the concave pattern 123 having the convex pattern 125 in the central portion. Alternatively, a plurality of concave patterns 123 having a plurality of convex patterns 125 may be formed. In other words, the reflective electrode 118 is formed on the organic insulating layer 104 having the concave patterns 123, and thus the reflective electrode 118 also has a substantially same pattern as the concave patterns 123 having the convex patterns 125.

The storage capacitor CST includes a common line 131 and an electrode pattern 132. The common line 131 is commonly formed on the pixel portions. The electrode pattern 132 extends from the drain electrode 114, and partially overlaps the common line 131. The gate insulating layer 102, the protective insulating layer 103 and the organic insulating layer 104 are sequentially formed on the common line 131. In FIGS. 5 to 7, the storage capacitor CST may be formed in the reflective area RA.

As best seen with reference to FIG. 7, the color filter substrate 200 includes a second base substrate 201, and a color filter layer 210 and a common electrode layer 220 formed on the second base substrate 201.

A portion of the color filter layer 210 corresponding to the reflective area RA is partially removed to form a light hole 211. The light hole 211 enhances a luminance of a first light L1 that is reflected from the reflective electrode 118.

The color filter layer 210 corresponding to the reflective area RA has a first depth t1. The color filter layer 210 corresponding to the transmissive area TA has a second depth t2 thicker than the first depth t1. Therefore, the color filter layer 210 corresponding to the transmissive area TA displays a color image having a higher purity than the color filter layer 210 corresponding to the reflective area RA.

The first light L1 of the reflective area RA passes through the color filter layer 210 twice. However, a second light L2 of the transmissive area TA passes through the color filter layer 210 only once. Since the color filter layer 210 of the transmissive area TA is thicker than that of the reflective area RA, a color reproducibility of the transmissive area TA is substantially the same as that of the reflective area RA.

The common electrode layer 220 is formed on the color filter layer 210, and is opposite to the pixel electrodes 117 and 118 of the array substrate 100.

The liquid crystal layer 300 is interposed between the array substrate 100 and the color filter substrate 200. The liquid crystal layer 300 has a different cell gap corresponding to the reflective area RA and the transmissive area TA. A first cell gap d1 is a gap between the common electrode layer 220 and the reflective electrode 118 in the reflective area RA, and a second cell gap d2 is a gap between the common electrode layer 220 and the transmissive electrode 117. The first cell gap d1 is about a half of the second gap d2 based on a light path of the first light L1 exiting the reflective area RA and a light path of the second light L2 exiting the transmissive area TA. The light paths of the first and second lights L1 and L2 are different from each other.

Figure 8A:
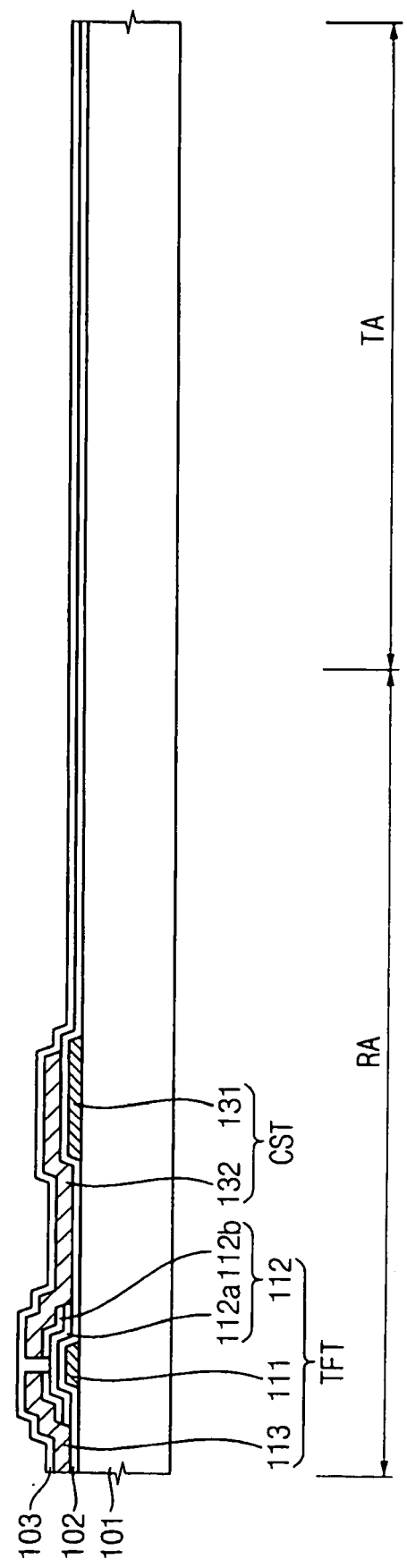

FIGS. 8A to 8C are cross-sectional views illustrating a method for manufacturing the reflective-transmissive type array substrate in FIG. 5.

Referring to FIGS. 5 and 8A, a gate metallic layer is deposited and patterned on the first base substrate 101 to form a gate metallic pattern. The gate metallic pattern includes the gate lines GLn−1 and GLn, the gate electrode 111 of the switching element TFT and the common line 131 of the storage capacitor CST. The gate metallic layer is a metal of having a low electrical resistance. Examples of the metal that can be used for the gate metallic layer include chrome (Cr), aluminum (Al), tantalum (Ta), molybdenum (Mo), titanium (Ti), tungsten (W), copper (Cu), argentums (Ag), for example, but are not limited thereto. These can be used alone, an alloy thereof or a combination thereof. Additionally, the gate metallic layer may have a multiple layered structure including more than two physically different materials. The gate metallic layer is deposited through a sputtering process and is patterned through a photolithography process, for example.

The gate insulating layer 102 is formed on the gate metallic pattern. The gate insulating layer 102 is formed by a plasma enhanced chemical vapor deposition ("PECVD") process. For example, a thickness of the gate insulating layer 102 may be about 4000 Å. For example, the gate insulating layer 102 may include an insulating material such as silicon nitride ("SiNx").

The active layer 112a and the ohmic contact layer 112b are sequentially deposited and patterned on the gate insulating layer 102 to form the channel portion 112. The active layer 112a includes amorphous silicon ("a-Si:H"), and the ohmic contact layer 112b is doped with a high density $n^+$ ion. The channel portion 112 is formed on the gate insulating layer 102 corresponding to the gate electrode 111 of the switching element TFT.

A source metallic layer is deposited and patterned on the first base substrate 101 having the channel portion 112 to form a source metallic pattern.

The source metallic pattern includes the plurality of source lines DLm−1 and DLm, the source electrode 113 of the switching element TFT and the drain electrode 114. In addition, the source metallic pattern may further include the electrode pattern 132 partially overlap the common line 131 of the storage capacitor CST. The source metallic layer is a metal having a low electrical resistance. Examples of the metal that can be used for the source metallic layer include chrome (Cr), aluminum (Al), tantalum (Ta), molybdenum (Mo), titanium (Ti), tungsten (W), copper (Cu), argentums (Ag), for example, but are not limited thereto. These can be used alone, an alloy thereof or a combination thereof. In addition, the source metallic layer may have a multiple layered structure having more than two physically different materials. The source metallic layer is deposited through a sputtering process, and is patterned through a photolithography process, for example.

The protective layer 103 is formed on the base substrate 101 having the source metallic pattern. The protective insulating layer 103 is formed by a PECVD process. For example, a thickness of the protective insulating layer 103 may be about 1000 Å. The protective insulating layer 103 may include an insulating material such as silicon nitride (SiNx).

Referring to FIGS. 5 and 8B, the organic insulating layer 104 is formed on the first base substrate 101 having the protective insulating layer 103. The organic insulating layer 104 includes the insulating material such as silicon nitride ("SiNx"), and a depth of the organic insulating layer 104 is about 4 μm.

The insulating layer 104 is patterned by a mask 400. The insulating layer 104 corresponding to the reflective area RA is patterned differently from the insulating layer 104 corresponding to the transmissive area TA. The mask 400 includes a blocking portion 410, a first opening portion 430 and a partial opening portion 450 corresponding to the reflective area RA. The first opening portion 430 is defined by the blocking portion 410, and the partial opening portion 450 is formed in a central portion of the first opening portion 430. The mask 400 may further include a second opening portion 470 corresponding to the transmissive area TA. The second opening portion 470 is opened in substantially an entire region of the transmissive area TA. The partial opening portion 450 includes a slit pattern or a half tone pattern.

The organic insulating layer 104 is exposed and developed using the mask 400 to pattern the organic insulating layer 104. The concave pattern 123 is formed by exposing a portion of the insulating layer 104 through the first opening portion 430. The convex pattern 125 that protrudes from the concave pattern 123 is formed by exposing a portion of the insulating layer 104 through the partial opening portion 450. The organic insulating layer 104 is partially removed by exposing a portion of the organic insulating layer 104 through the second opening portion 470.

That is, the concave pattern 123 is formed on the insulating layer 104 corresponding to the reflective area RA, and the convex pattern 125 is formed in the central portion of the concave pattern 123.

According to Equations 1 and 2, when the interfacial inclination angle $\theta_t$ of the concave pattern 123 is in the range between about 0° and about 20°, the exiting angle of the reflective light has the conical shape, for example, in the range between about −30° and about 30° with reference to the normal line that is substantially perpendicular to the front surface of the first base substrate 101. In FIG. 8B, the convex pattern 125 protrudes from the central portion of the concave pattern 123 so that the size of the region having the interfacial inclination angle $\theta_t$ of about 10° is increased.

That is, the convex pattern 125 is formed on the central portion of the concave pattern 123. Therefore, the size of the region of the interfacial inclination angle $\theta_t$ of about 10° that enhances the reflectivity is increased.

The organic insulating layer 104 corresponding to the transmissive area TA is removed. Furthermore, the contact hole 116 is formed in a portion of the organic insulating layer 104 corresponding to the reflective area RA, and exposes a portion of the drain electrode 114.

Referring to FIGS. 5 and 8C, the pixel electrode PE is formed on the patterned organic insulating layer 104, and is electrically connected to the drain electrode 114 through the contact hole 116. The transparent conductive material is deposited and patterned on the patterned organic insulating layer 104 to form the transmissive electrode 117. Examples of the transparent conductive material that can be used for the transmissive electrode 117 include indium tin oxide ("ITO"), indium zinc oxide ("IZO"), indium tin zinc oxide ("ITZO"), for example, but are not limited thereto.

The transmissive electrode 117 is electrically connected to the drain electrode 114 through the contact hole 116. A reflective metallic layer is deposited and patterned on the transmissive electrode 117 to form the reflective electrode 118. The reflective electrode 118 includes a metallic material. Examples of the metallic material that can be used for the reflective electrode 118 include aluminum (Al), neodymium (Nd), molybdenum (Mo), tungsten (W), argentums (Ag), for example. These can be used alone, an alloy thereof or a combination thereof.

The reflective electrode 118 is formed on the organic insulating layer 104 having the concave pattern 123 and the convex pattern 125. The reflective electrode 118 has a substantially same pattern as the concave pattern 123 and the convex pattern 125. The interfacial inclination angle of the concave pattern 123 is between about 0° and about 20°. When the interfacial inclination angle is 10°, the reflectivity is maximized. The convex pattern 125 is formed on the central portion of the concave pattern 123 thus maximizing the size (e.g., surface area) of the region having the interfacial inclination angle $\theta_t$ of about 10°, thereby enhancing the reflectivity of the reflective electrode 118.

Figure 9:
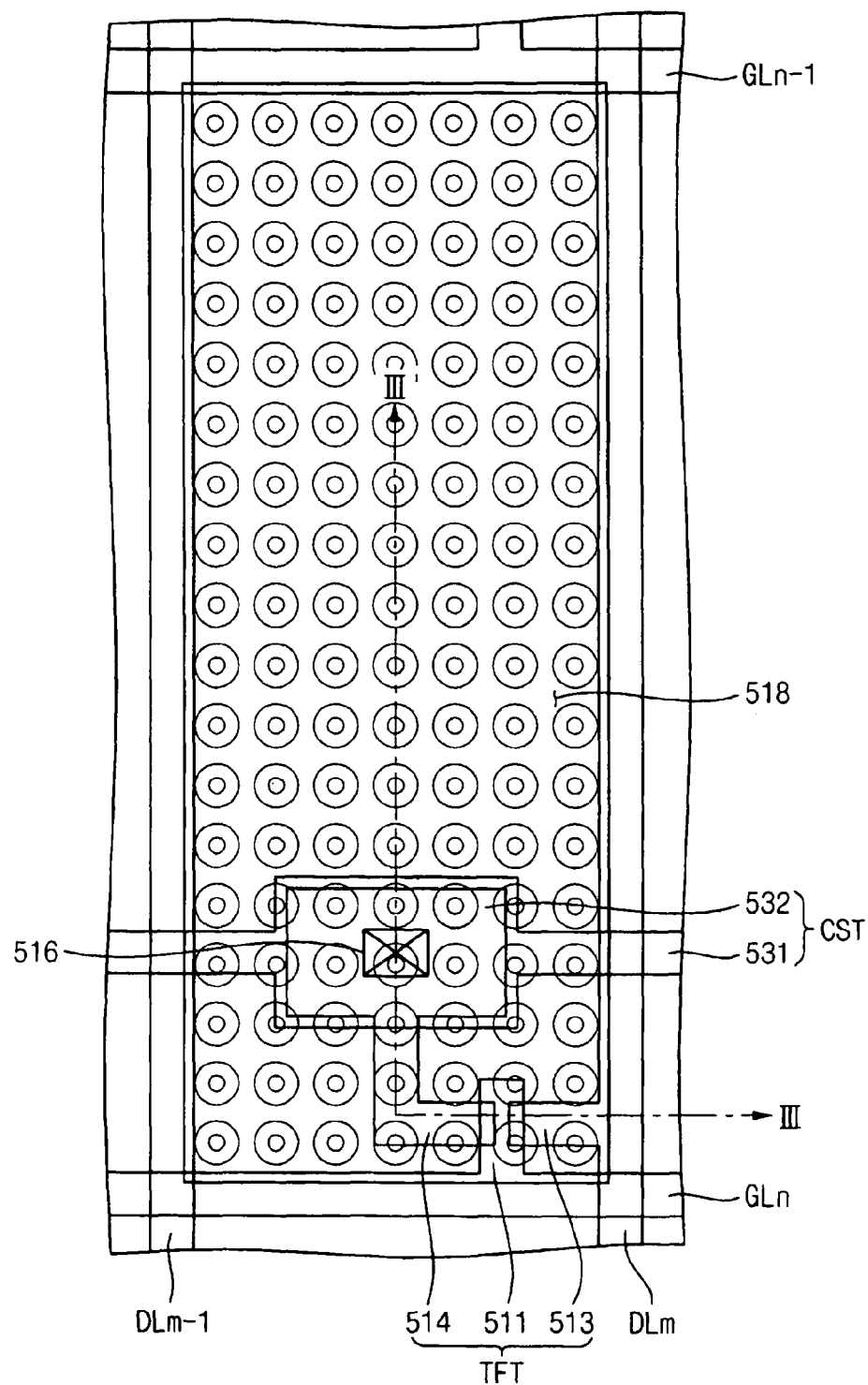
FIG. 9 is a plan view illustrating a reflective type array substrate according to still another exemplary embodiment of the present invention.
Figure 10:
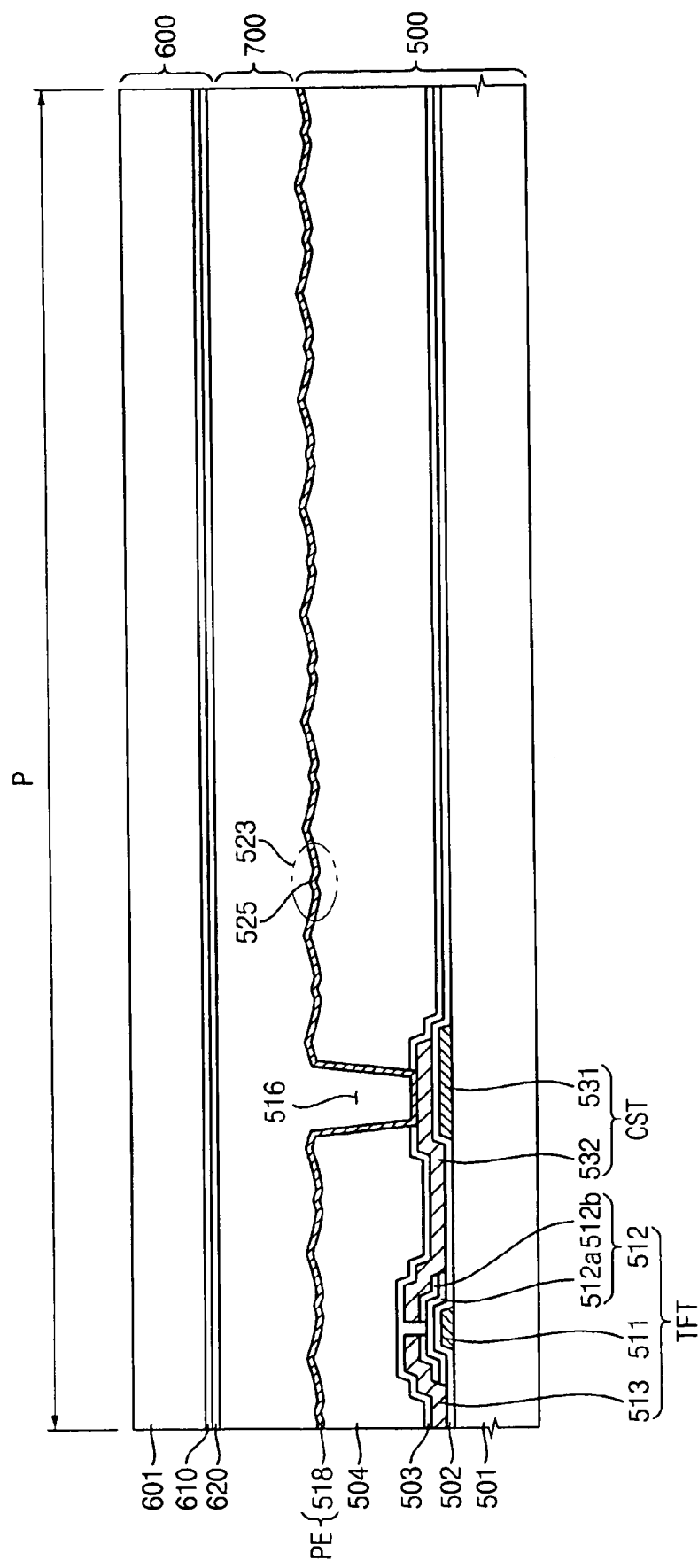
FIG. 10 is a cross-sectional view taken along line III-III' of FIG. 9 III-III'.

FIG. 9 is a plan view illustrating a reflective type array substrate according to still another exemplary embodiment of the present invention. FIG. 10 is a cross-sectional view taken along line III-III' of FIG. 9.

Referring to FIGS. 9 and 10, the display panel includes a reflective type array substrate 500, a color filter substrate 600 and a liquid crystal layer 700 disposed therebetween.

The reflective type array substrate 500 includes a first base substrate 501, a plurality of gate lines GLn−1 and GLn, a plurality of source lines DLm−1 and DLm and a plurality of pixel portions P. The gate lines GLn−1 and GLn extending in a first direction are formed on the first base substrate 501. The source lines DLm−1 and DLm extending in a second direction across the first direction are also formed on the first base substrate 501. The pixel portions P are defined by the gate lines GLn−1 and GLn and the source lines DLm−1 and DLm formed on the first base substrate 501. Each pixel portion P includes a switching element TFT, a pixel electrode PE and a storage capacitor CST. The switching element TFT is electrically connected to one of the gate lines GLn and one of the source lines DLm. The pixel electrode PE is electrically connected to the switching element TFT.

The switching element TFT includes a gate electrode 511, a source electrode 513 and a drain electrode 514. The gate electrode 511 extends from the gate line GLn, and the source electrode 513 extends from the source line DLm. In addition, the drain electrode 514 is electrically connected to the reflective electrode 518 through the contact hole 516.

A gate insulating layer 502 is formed on the gate lines GL n−1 and GL n and the gate electrode 511. Corresponding to a region including the gate electrode 511, a channel portion 512 is formed on the gate insulating layer 502. The channel portion 512 includes an active layer 512a and an ohmic contact layer 512b. A small portion of the ohmic contact layer 512b between the source and drain electrodes 513, 514A, is removed to define a channel of the switching element TFT. A protective insulating layer 503 is formed on the switching element TFT and the source lines DL m−1 and DL m.

An organic insulating layer 504 is formed on the switching element TFT, and a concave pattern 523 having a convex pattern 525 in a central portion is formed on an upper surface of the organic insulating layer 504. For example, the organic insulating layer 504 may include the insulating material such as silicon nitride ("SiNx"), and a depth of the organic insulating layer 504 is about 4 μm.

The reflective electrode 518 includes a metallic material. Examples of the metallic material that can be used for the reflective electrode 118 include aluminum (Al), neodymium (Nd), molybdenum (Mo), tungsten (W), argentums (Ag), for example, but are not limited thereto. These can be used alone, an alloy thereof or a combination thereof.

The reflective electrode 518 is formed on the organic insulating layer 504 having the concave pattern 523 and the convex pattern 525. The reflective electrode 518 has a substantially same pattern as the concave pattern 523 and the convex pattern 525.

According to Equations 1 and 2, when the interfacial inclination angle $\theta_t$ of the concave pattern 523 is in the range between about 0° and about 20°, the exiting angle of the reflective light has the conical shape, for example, in the range between about −30° and about 30° with reference to the normal line that is substantially perpendicular to the front surface of the first base substrate 501. In FIG. 10, the convex pattern 525 protrudes from the central portion of the concave pattern 523 so that the size of the region having the interfacial inclination angle θ, of about 10° is increased.

The convex pattern 525 is formed on the central portion of the concave pattern 523. Therefore, the size of region (surface area) of the interfacial inclination angle θ, of about 10° is maximized, thus enhancing the reflectivity of the reflective electrode 518.

The storage capacitor CST includes a common line 531 and an electrode, pattern 532. The common line 531 is commonly formed on the pixel portions.

The electrode pattern 532 extends from the drain electrode 514, and partially overlaps the common line 531. The gate insulating layer 502, the protective insulating layer 503 and the organic insulating layer 504 are sequentially formed on the common line 531.

The gate lines GLn-1 and GLn, the source lines DLm-1 and DLm, the common line 531, the electrode pattern 532, the gate electrode 511, the source electrode 513 and the drain electrode 514 are metal having a low electrical resistance. Examples of the metal that can be used for the gate metallic layer include chrome (Cr), aluminum (Al), tantalum (Ta), molybdenum (Mo), titanium (Ti), tungsten (W), copper (Cu), argentums (Ag), for example, but are not limited thereto. These can be used alone, an alloy thereof or a combination thereof.

A color filter substrate 600 includes a second base substrate 601, and a color filter layer 610 and a common electrode layer 620 formed on the second base substrate 601. The color filter layer 610 displays a color gradation by expressing a particular color. The common electrode layer 620 includes the transparent conductive material. Examples of the transparent conductive material that can be used for the transmissive electrode 117 include indium tin oxide ("ITO"), indium zinc oxide ("IZO"), indium tin zinc oxide ("ITZO"), for example, but are not limited thereto.

The liquid crystal layer 700 is disposed between the array substrate 500 and the color filter substrate 600. A potential difference between the reflective electrode 518 of the array substrate 500 and the common electrode layer 620 of the color filter substrate 600 varies an array angle of liquid crystal molecules.

According to the present invention, the convex pattern is formed on the central portion of the concave pattern, so that the size of the region (surface area) having the interfacial inclination angle of about 10° is maximized, thereby enhancing the reflectivity of the reflective electrode 118.

In particular, when the interfacial inclination angle θ, of the concave pattern is in the range between about 0° and about 20°, the exiting angle of the reflective light has the conical shape, for example, in the range between about −30° and about 30° with reference to a normal line substantially in perpendicular to the front surface. The normal line corresponds to an angle of about 0°. The convex pattern is formed on the central portion of the concave pattern, so that the size of the region having the interfacial inclination angle of about 10° is maximized, thereby enhancing the reflectivity of the reflective electrode.

Having described the exemplary embodiments of the present invention and its advantages, it is noted that various changes, substitutions and alterations can be made herein without departing from the spirit and scope of the present invention as defined by appended claims.

What is claimed is:

1. An array substrate comprising:
   a plurality of gate lines extending in a first direction;
   a plurality of source lines extending in a second direction across the first direction;
   a plurality of pixel portions defined by the gate lines and the source lines;
   a switching element formed on each pixel portion, the switching element electrically connected to one of the gate lines and one of the source lines; and
   a pixel electrode formed on the switching element and electrically connected to the switching element, the pixel electrode including concave patterns respectively having convex patterns in central portions of the concave pattern with respect to a reference surface of the pixel electrode most distal from the switching element on the basis of height,
   wherein a height of a boundary portion between the concave patterns substantially identical to a height of the reference surface.

2. The array substrate of claim 1, further comprising an organic insulating layer formed between the switching element and the pixel electrode, wherein the concave pattern is formed on an upper surface of the organic insulating layer.

3. The array substrate of claim 2, wherein the pixel electrode is a reflective electrode that reflects a first light.

4. The array substrate of claim 1, wherein the pixel electrode comprises a reflective electrode that reflects a first light, and a transmissive electrode that transmits a second light in a same direction of the reflected first light, wherein the concave pattern is formed on the reflective electrode.

5. A method for manufacturing an array substrate, comprising:
   forming a switching element on a base substrate, the switching element electrically connected to a gate line extending in a first direction and a source line extending in a second direction across the first direction;
   forming an organic insulating layer on the base substrate having the switching element;
   patterning the organic insulating layer to have concave patterns with respect to a reference surface most distal from the base substrate on the basis of height, and to respectively have convex patterns with respect to interfacial surfaces of the concave patterns in central portion of the concave patterns; and
   forming a pixel electrode contacting the switching element on the organic insulating layer having the concave patterns formed thereon,
   wherein a height of a boundary portion between the concave patterns substantially identical to a height of the reference surface.

6. The method of claim 5, wherein the organic insulating layer is patterned using a mask, the mask including:
   a blocking portion which blocks light in a portion corresponding to the reference surface;
   an opening portion which transmits the light in a portion corresponding to the concave pattern; and
   a partial opening portion which partially transmits the light in a portion corresponding to the convex pattern.

7. The method of claim 5, wherein patterning the organic insulating layer further comprises forming a contact hole contacting the switching element with the pixel electrode.

8. The method of claim 5, wherein the patterning of the organic insulating layer comprises forming the concave pattern and the convex pattern corresponding to a portion having the reflective electrode formed thereon.

9. The method of claim 5, wherein forming of the pixel electrode comprises:

forming a transmissive electrode which contacts the switching element on the organic insulating layer having the concave pattern formed thereon; and forming a reflective electrode in a small portion of the transmissive electrode.

10. The method of claim 5, wherein the pixel electrode is a reflective electrode including a reflective metallic material.

11. A display panel comprising:

an array substrate including a plurality of pixel portions, each of the pixel portions including a switching element and a pixel electrode formed on the switching element, the pixel electrode having concave patterns which respectively include convex patterns in central portions of the concave patterns with respect to a reference surface of the pixel electrode most distal from the array substrate on the basis of height and electrically connected to the switching element;

a color filter substrate opposite to the array substrate; and a liquid crystal layer disposed between the array and color filter substrates, wherein a height of a boundary portion between the concave patterns substantially identical to a height of the reference surface.

12. The display panel of claim 11, wherein the pixel electrode comprises a reflective metallic material and is a reflective electrode reflecting a first light.

13. The display panel of claim 12, wherein the pixel electrode comprises the reflective electrode that reflects the first light, and a transmissive electrode that transmits a second light, and wherein the reflective electrode has the concave pattern formed thereon.

14. The display panel of claim 13, wherein the liquid crystal layer comprises a different cell gap between a reflective area reflecting the first light from a transmissive area transmitting the second light.

15. The array substrate of claim 1, wherein an interfacial inclination angle of the concave pattern is between about 0° and about 20°.

16. The array substrate of claim 15, wherein the interfacial inclination angle of the convex pattern is between about 5° and about 15°.

17. The method of claim 5, wherein an interfacial inclination angle of the concave pattern is between about 0° and about 20°.

18. The method of claim 17, wherein the interfacial inclination angle of the convex pattern is between about 5° and about 15°.

19. The display panel of claim 11, wherein an interfacial inclination angle of the concave pattern is between about 0° and about 20°.

20. The display panel of claim 19, wherein the interfacial inclination angle of the convex pattern is between about 5° and about 15°.

* * * * *